US007310193B2

United States Patent
Wulff et al.

(10) Patent No.: US 7,310,193 B2
(45) Date of Patent: Dec. 18, 2007

(54) SYSTEM AND METHOD FOR MANUFACTURING AN ASSEMBLY INCLUDING A HOUSING AND A WINDOW MEMBER THEREIN

(75) Inventors: Thomas Wulff, North Patchogue, NY (US); Robert Spano, Smithtown, NY (US); Tim Austin, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 407 days.

(21) Appl. No.: 10/848,492

(22) Filed: May 18, 2004

(65) Prior Publication Data

US 2004/0213866 A1    Oct. 28, 2004

Related U.S. Application Data

(63) Continuation of application No. 10/128,609, filed on Apr. 22, 2002, now Pat. No. 6,760,165.

(51) Int. Cl.
*G02B 27/00* (2006.01)
*G02B 3/00* (2006.01)
*H04N 1/46* (2006.01)

(52) U.S. Cl. ..................................... 359/809; 358/505
(58) Field of Classification Search ................ 359/809; 358/474, 505; 250/235; D14/425; 348/98–100
See application file for complete search history.

(56) References Cited

U.S. PATENT DOCUMENTS

| | | | | |
|---|---|---|---|---|
| 5,339,584 A | * | 8/1994 | Ohtake et al. | 296/146.15 |
| 6,046,449 A | * | 4/2000 | Chien | 250/235 |
| 6,124,951 A | * | 9/2000 | Chiang et al. | 358/474 |
| 6,587,231 B1 | * | 7/2003 | Sung | 358/497 |

* cited by examiner

*Primary Examiner*—Alicia M Harrington
(74) *Attorney, Agent, or Firm*—Amin, Turocy & Calvin, LLP

(57) ABSTRACT

Described is an assembly, which includes a housing and a window member therein. Also, described is a method and system for manufacturing such assembly. In particular, a first part and a second part are approximated into a molding configuration to create a first mold therebetween. The first mold includes first and second molding cavities. When the first and second parts are in the molding configuration, the second molding cavity is sealed with respect to the first molding cavity. Then, a first molding material is added into the first molding cavity to create a housing. A window member is inserted into the second molding cavity. The second part is replaced with a third molding cavity surrounding a perimeter of the window member. Subsequently, a second molding material is added to the third molding cavity to create a seal surrounding the perimeter of the window member.

12 Claims, 7 Drawing Sheets

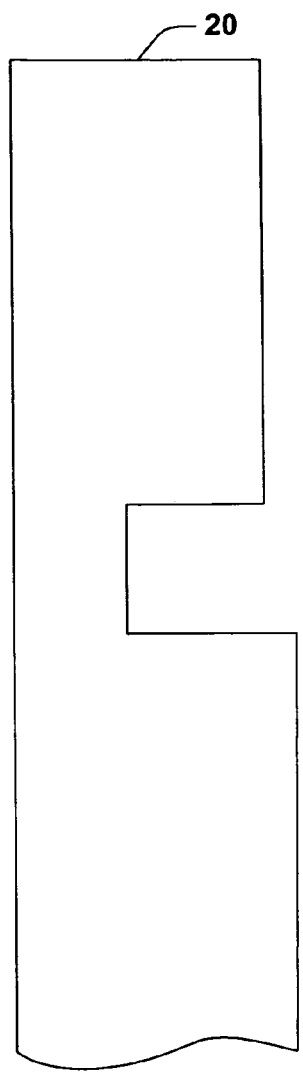 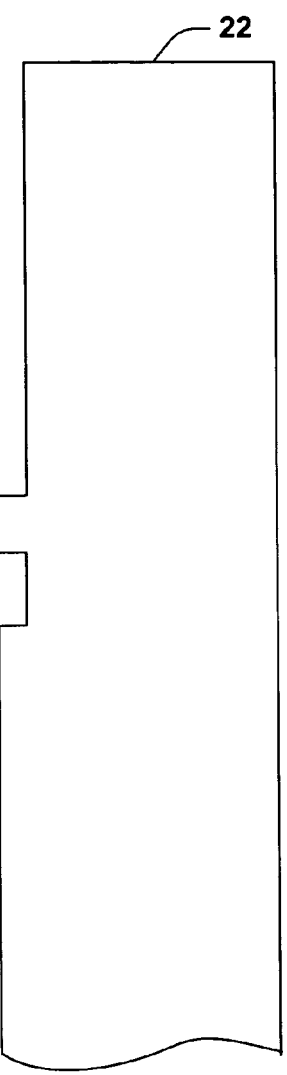 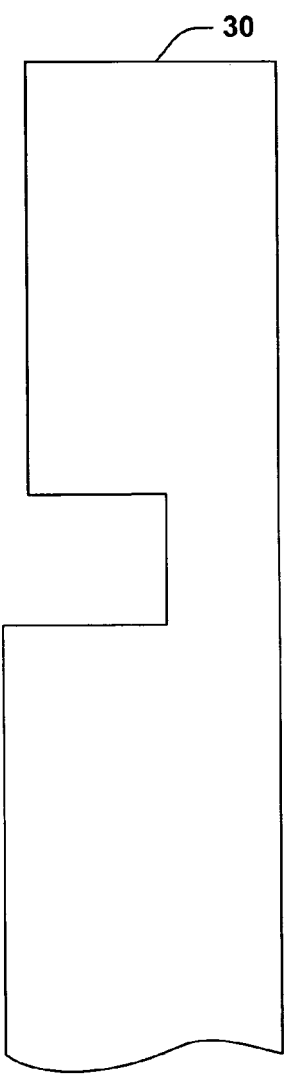
Fig. 6a  Fig. 6b  Fig. 6c

SYSTEM AND METHOD FOR MANUFACTURING AN ASSEMBLY INCLUDING A HOUSING AND A WINDOW MEMBER THEREIN

CROSS-REFERENCE TO RELATED APPLICATIONS

This application is a continuation of U.S. application Ser. No. 10/128,609, filed Apr. 22, 2002 now U.S. Pat. No. 6,760,165 entitled SYSTEM AND METHOD FOR MANUFACTURING AN ASSEMBLY INCLUDING A HOUSING AND A WINDOW MEMBER THEREIN, the entirety of which is incorporated herein by reference.

BACKGROUND

A conventional optical window is utilized in an electronics enclosure (or a housing) to provide a means of allowing an optical signal from an optical sensing device (e.g., a laser scanner, a digital camera, a CCD device, an IR device, etc.) and a return signal to pass with minimal distortion and loss through an environmentally sealed optical aperture. Such window prevents water, electro-static discharge ("ESD"), dust and moisture from entering the housing thereby protecting sensitive electronics and optical devices contained within. The conventional optical window is assembled into the housing as a secondary operation requiring several parts and several assembly operations.

FIG. 1 shows a conventional assembly 1, which includes a bezel 4, a sealing material (gasket) 8, a window 6 and a housing 2. For a plastic injection-molded housing 2, a mold tool is required for the bezel 4, as well as for the housing 2. Each part is fabricated separately. The bezel 4 is placed over the window 6 and is ultrasonically welded to the housing 2. The bezel 4 fixes the window 6 in place, while the gasket 8 provides the environmental seal.

The above-described method requires a significant number of post-molding operations. The parts must be fabricated, inspected, packaged and transported to the final assembly location. The parts are removed manually by the operator, inspected and cleaned if necessary. The operator places the parts in a nest tool to properly align them for the ultrasonic welding operation. The horn of the ultrasonic welding apparatus must fit into the cavity of the housing in order to apply energy to the parts for welding. After the welding energy is applied, the operator removes the assembly from the fixture and visually inspects it for proper alignment of all parts.

The process results in yield loss and poor reliability. A visual inspection is a poor way to screen for seal defects. For example, a housing 2 with an inadequate seal 8 may escape this screening and there is yield loss as the parts may leak due to improper installation of the gasket 8 or improper functioning of the ultrasonic welding equipment. In addition, the gasket 8 may lose elasticity or adhesion over time, resulting in a leaking housing 2 which is not environmentally sealed.

SUMMARY

Described is an assembly, which includes a housing and a window member therein. Also, described is a method and system for manufacturing such assembly. In particular, a first part and a second part are approximated into a molding configuration to create a first mold therebetween. The first mold includes first and second molding cavities. When the first and second parts are in the molding configuration, the second molding cavity is sealed with respect to the first molding cavity. Then, a first molding material is added into the first molding cavity to create a housing. A window member is inserted into the second molding cavity. The second part is replaced with a third part to form a second mold including a third molding cavity surrounding a perimeter of the window member. Subsequently, a second molding material is added to the third molding cavity to create a seal surrounding the perimeter of the window member.

BRIEF DESCRIPTION OF THE DRAWINGS

FIG. 6a shows an exemplary embodiment of a first part of a molding configuration according to the present invention;

FIG. 6b shows an exemplary embodiment of a second part of the molding configuration according to the present invention; and FIG. 6c shows an exemplary embodiment of a third part of the molding configuration according to the present invention.

DETAILED DESCRIPTION

Figure 1:
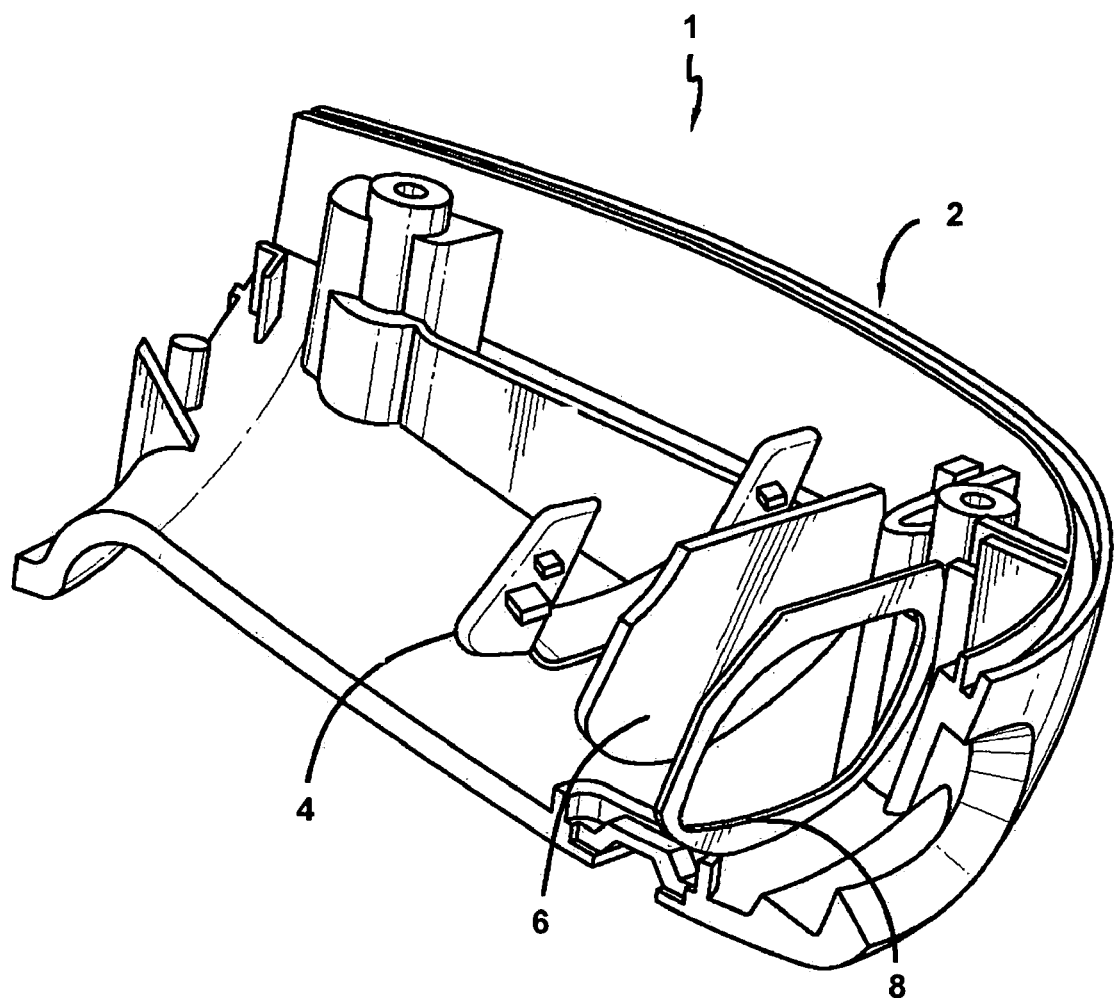
FIG. 1 shows a conventional assembly.
Figure 2A:
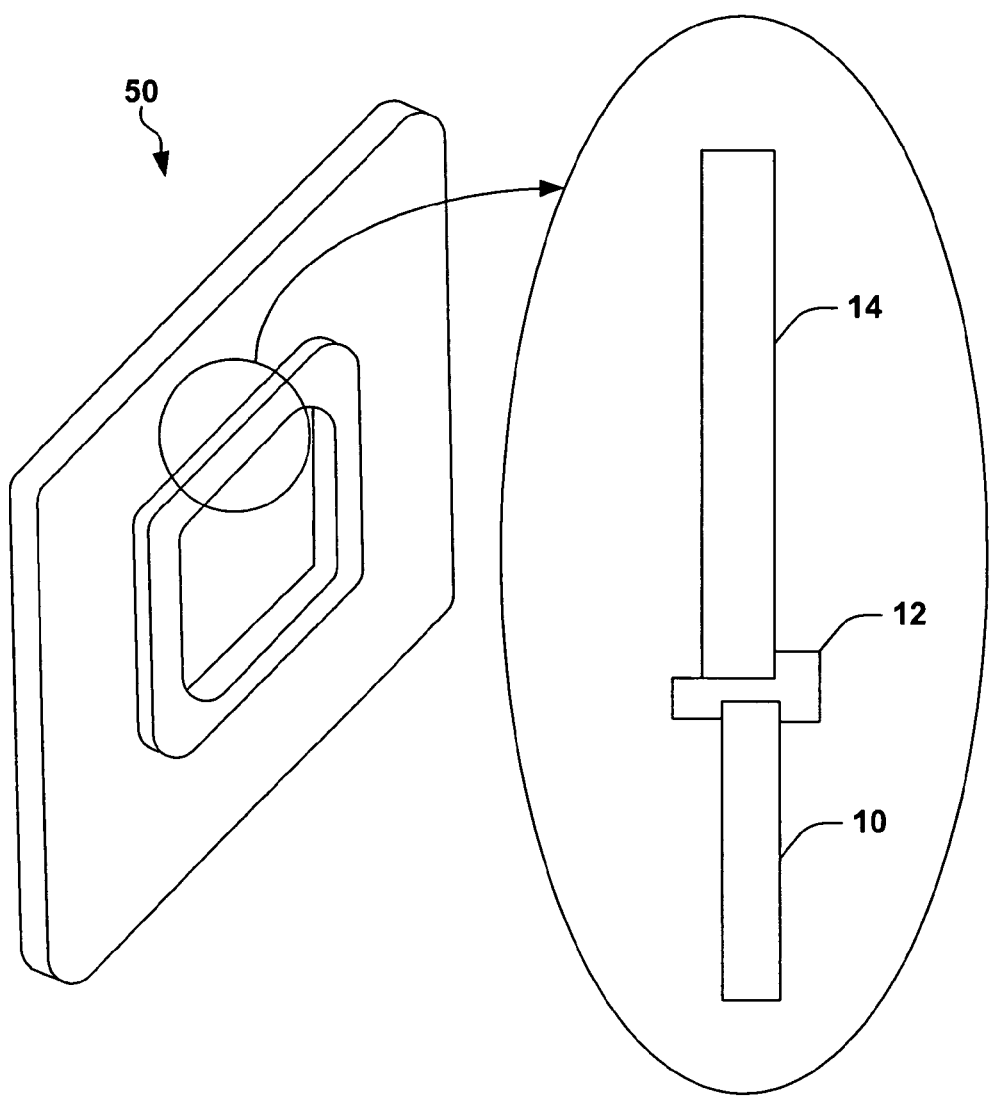
FIG. 2a shows an exemplary embodiment of an assembly including a housing with a window member therein according to the present invention.

FIG. 2a shows an exemplary embodiment of an assembly 50 according to the present invention. The assembly 50 includes a housing 14 and a window member 10 therein. The window member 10 is sealed within the housing 14 using a seal 12. The sealing process is performed during manufacturing of the housing 14 and is described in detail below. The housing 14 may include, for example, a housing of a hand-scanner and the window member 10 may include, e.g., a piece of glass, plastic or any other transparent or semi-transparent material. The window member 10 may have a plurality of geometrical shapes, e.g., rectangular, round, oval, polygonal, etc.

Figure 3:
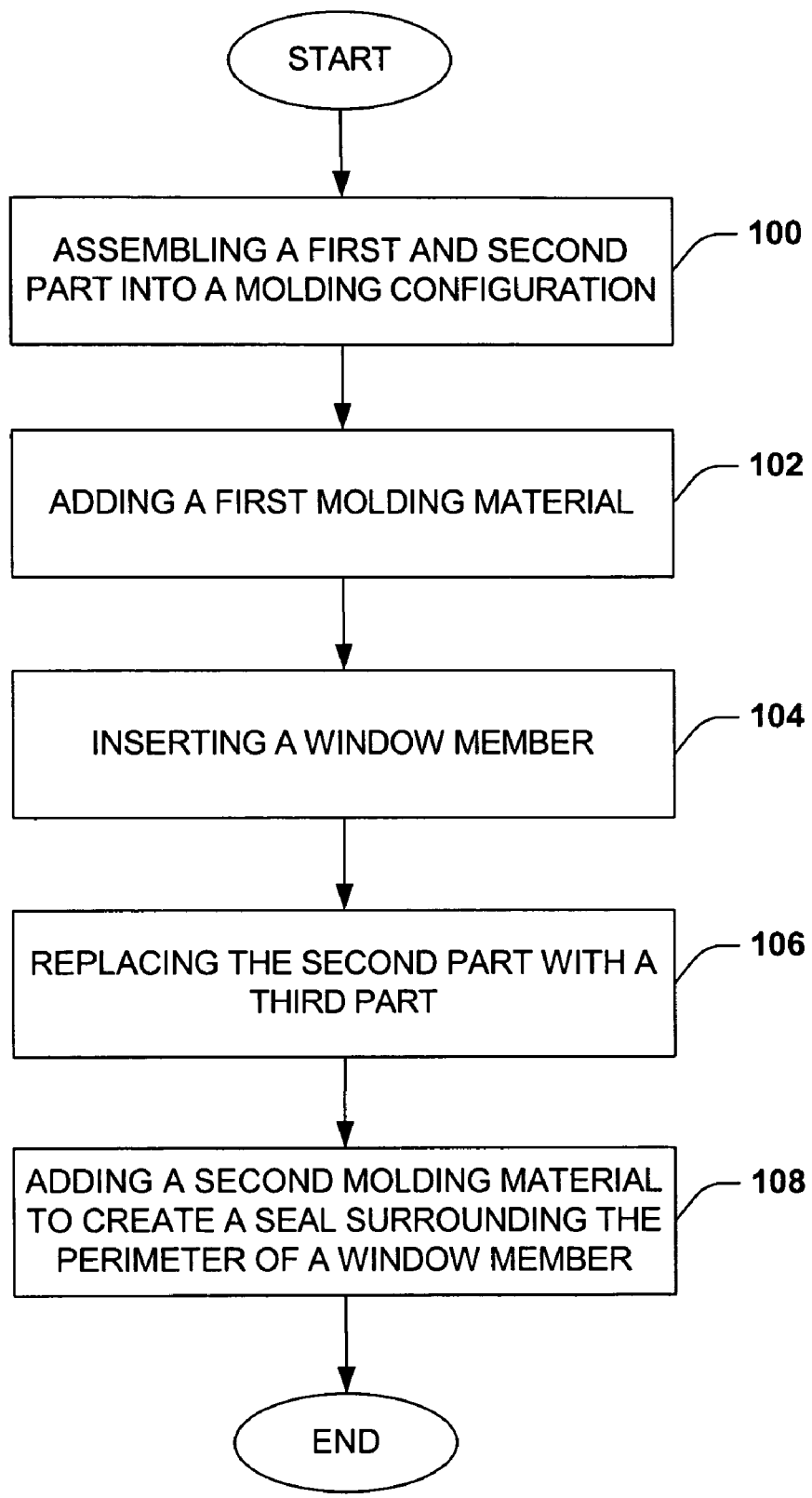
FIG. 3 shows an exemplary embodiment of a method according to the present invention.
Figure 4:
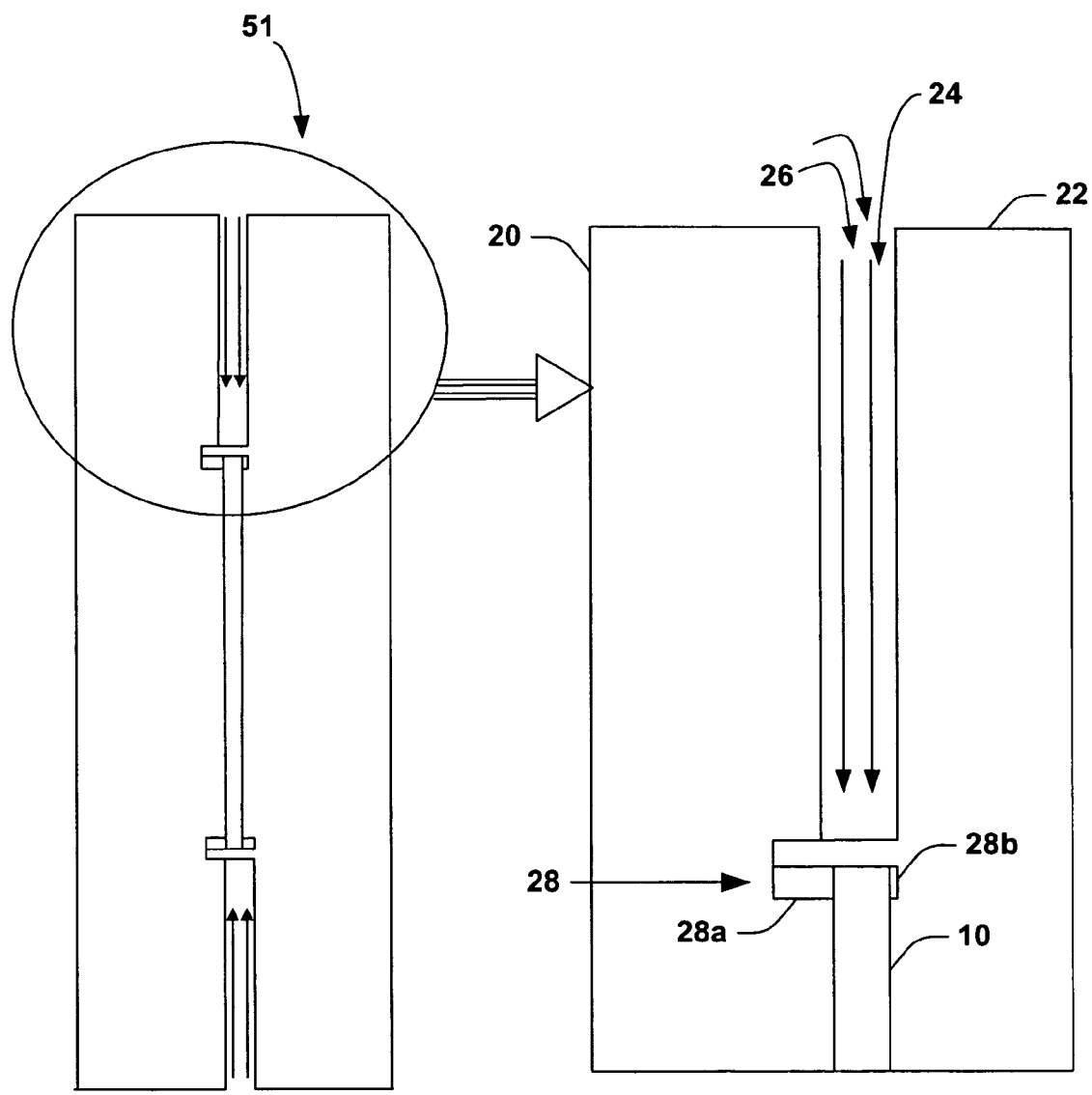
FIG. 4 illustrates a portion of the method shown in FIG. 3.

FIG. 3 shows an exemplary embodiment according to the present invention of a method for manufacturing the assembly 50 having the housing 14 with the window member 10 therein. In step 100, a first part 20 and a second part 22 are assembled into a molding configuration (See FIGS. 6a, 6b). This molding configuration, as shown in FIG. 4, creates a first mold 51 that has a first molding cavity 24 and a second molding cavity 28. The first and second parts 20, 22 are so configured that when they are in an assembled mode, the second molding cavity 28 is sealed with the respect to the first molding cavity 24. Those skilled in the art would understand that a plurality of shapes of the first and second parts 20, 22 may be utilized to achieve the same result.

In step 102, a first molding material 26 is added into the first molding cavity 24 as shown by the arrows in FIG. 4. The addition of the first molding material 26 may be performed by an injection process. The first molding material 26 may be a conventional thermo-plastic material. The first molding material 26 fills in only the first molding cavity 24 and is prevented from entering the second molding cavity 28 by the configuration of the first and second parts 20, 22. The first and second parts 20, 22 are held in the assembled mode for a predetermined time period so that the first molding material 26 may harden to create the housing 14.

Figure 5:
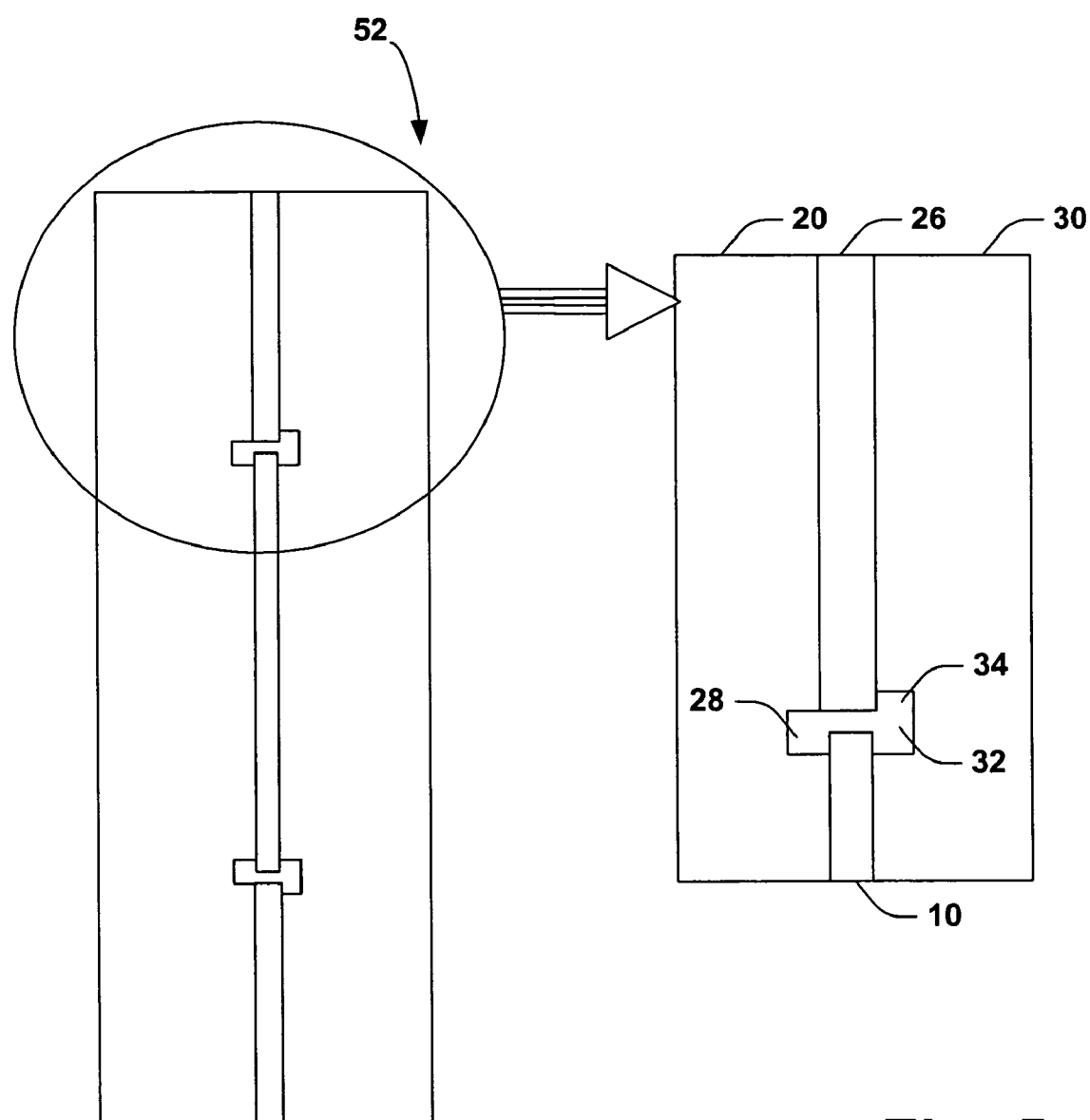
FIG. 5 illustrates another portion of the method shown in FIG. 3.

In step 104, the window member 10 may be inserted into a molding assembly as shown in FIGS. 4 & 5. Those skilled in the art would understand that the window member 10 may also be inserted into the first mold 51 (e.g., before the step 102) or into a second mold 52 (e-g., after the step 102). The window member 10 is inserted into the second molding cavity 28, which is free from the first molding material 26 (see step 102). For example, FIG. 4 shows the window member 10 inserted before the step 102. The window member 10 covers a portion of the second molding cavity 28 while leaving free sub-spaces 28a, 28b.

To insert the window member 10 before step 102, the second part 22 is temporary disassembled from the first part 20 by the action of injection molding equipment and then put together once the window member 10 is inserted into the second molding cavity 28. To insert the window member 10 after the step 102, the second part 22 is removed and the window member 10 is inserted. After the window member 10 is inserted into the second molding cavity 28, a third part 30 is assembled with the first part 20 to form the second mold 52 (step 106). The third part 30, shown in FIG. 6c, may replace the second part 22 either manually or automatically by the action of a rotating or sliding (shuttle) platen. The first and third parts 20, 30 may be held with a predetermined pressure by an injection-molding machine.

FIG. 5 shows the first and third parts 20, 30 in an assembled position. The second mold 52 includes a third cavity 32, which surrounds a perimeter of the window member 10. A geometry of the third cavity 32 defines a shape of a second molding material 34 which is injected into the third cavity 32 of the second mold to create the seal 12 around the window member 10, as shown in FIG. 2a (step 108). The second molding material 34 may be a thermoplastic elastomer material. Subsequently, the housing 14 is ejected from the second mold 52.

Figure 2B:
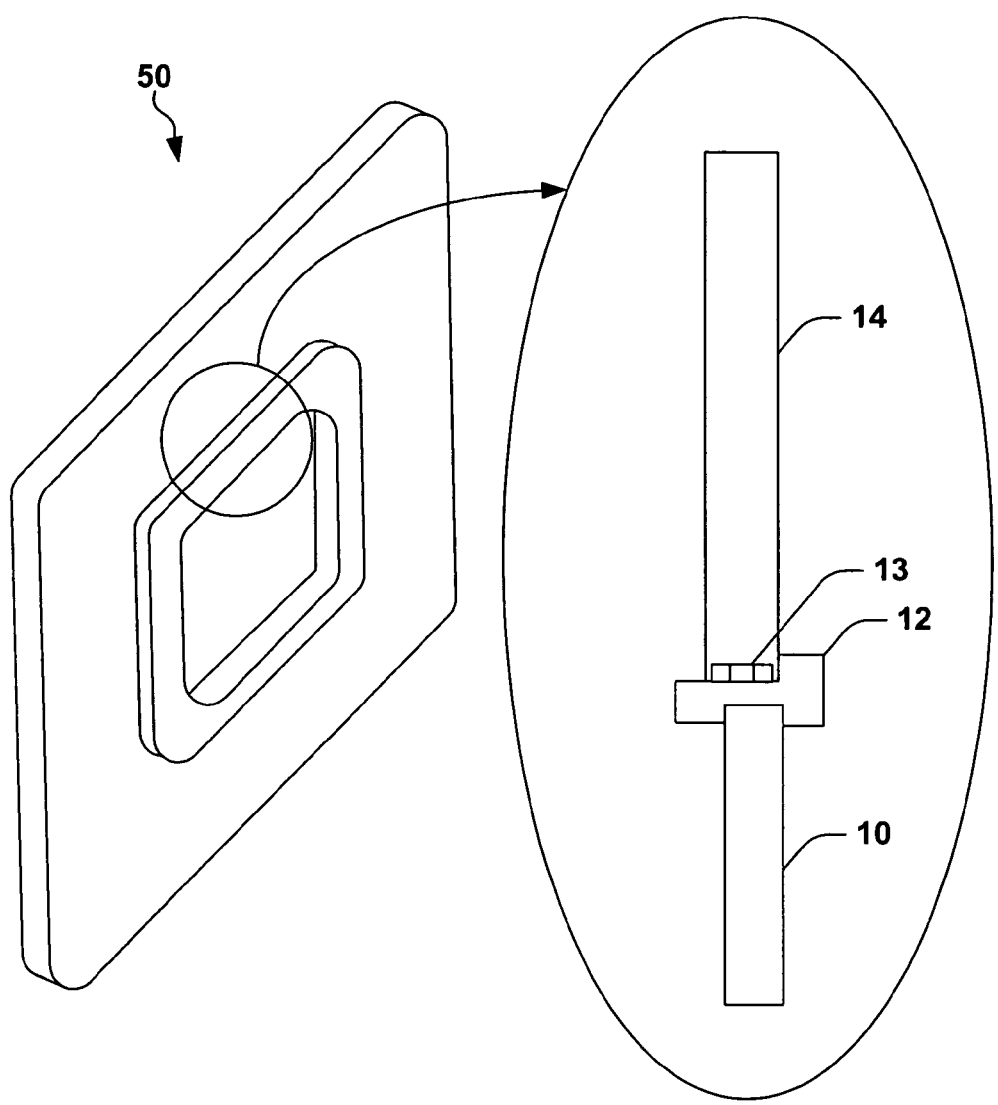
FIG. 2b shows another exemplary embodiment of the assembly.

In the alternative exemplary embodiment of the present invention, as shown in FIG. 2b, the second molding material 34 is heated to its appropriate injection temperature and then injected into the third cavity 32. The temperature of the second molding material 34 is at or above the melting point of the first molding material 26 so that the heat may soften or melt the first molding material 26 at the interface between the first molding material 26 and the second molding material 34. The first and second molding materials 26, 34 mix together to create a melt-bond region 13. Then, the seal 12 is cooled so that the housing 14 may be ejected from the second mold 52.

An impact resistance improves as the seal 12 may attenuate shock loads that would normally be transferred to the window 10. In addition, optical performance improves as mechanical loads caused by the shrinkage of the first molding materials 26 are eliminated by the low-modulus second molding material 34. Furthermore, the seal 12 reliability improves, as process variation in the ultrasonic welding process is no longer a concern.

The present invention eliminates the need for a bezel and a gasket in the assembly. Thus, tooling costs to produce these parts are eliminated. In addition, the cost is reduced as all post-molding assembly operations are eliminated.

Furthermore, the present invention increases usable internal housing volume by eliminating the bezel and associated internal structures. Also, a geometry of the seal design can be tailored for specific applications. For example, for severe environmental requirements, the second molding material 34 overlap may be increased. The unconstrained second molding material 34 volume may be tailored to achieve a desired damping effect for extreme shock loads. Any two melt-compatible first and second molding materials 26, 34 may be used.

The present invention may be utilized for scanner windows as well as other types of windows, such as display windows, etc.

There are many modifications to the present invention, which will be apparent to those skilled in the art without departing form the teaching of the present invention. The embodiments disclosed herein are for illustrative purposes only and are not intended to describe the bounds of the present invention, which is to be limited only by the scope of the claims appended hereto.

What is claimed is:
1. A housing with embedded window comprising:
a first molding portion; and
a window member disposed between two first molding portions and sealed by a second molding portion molded around the perimeter of the window member, and between the window member and the first molding portions, the first and second molding portions formed of materials that mix together to create a melt-bond region.
2. The housing of claim 1, wherein the first and second molding comprise different molding material.
3. The housing of claim 1, wherein the first molding includes a thermo-plastic material.
4. The housing of claim 1, wherein the second molding portion protrudes over a portion of the window member and first molding portion so as to attenuate shock loads and further seal the window member.
5. The housing of claim 1, wherein a melt-bond region is formed surrounding the perimeter of the window member between the first and second molding portions.
6. The housing of claim 1, wherein the window member is composed of one of a glass material and a plastic material.
7. The housing of claim 6, wherein the window member shape includes one of rectangular, round, and polygonal.
8. The housing of claim 1, wherein the window and the housing form a portion of a scanner.
9. The housing of claim 1, wherein the first and second molding portions are formed from three molds, first and second molds combine to form the first molding portion and the first and third molds combine to generate the second molding portion.
10. The housing of claim 9, wherein the first and second molds form two cavities physically separated from one another.
11. The housing of claim 10, wherein a first cavity is filled with a molding material and the second cavity receives and is bifurcated by the window member.
12. The housing of claim 11, wherein the second mold is removed and the third mold applied that includes a third cavity that when filled with a molding material protrudes over a portion of the window member and first molding portion so as to attenuate shock loads and further seal the window member.

* * * * *